United States Patent [19]
Deacon

[11] 3,913,759
[45] Oct. 21, 1975

[54] WHEELCHAIR LIFT

[76] Inventor: Scott C. Deacon, 6581 Pinion, Agoura, Calif. 91301

[22] Filed: Oct. 15, 1973

[21] Appl. No.: 406,254

[52] U.S. Cl. .................... 214/77 R; 214/DIG. 10
[51] Int. Cl.² ........................................ B60P 1/48
[58] Field of Search ..... 214/75 R, 75 T, 77 R, 77 P, 214/DIG. 10

[56] References Cited
UNITED STATES PATENTS

| | | | |
|---|---|---|---|
| 2,350,641 | 6/1944 | Ruddock | 214/77 P |
| 2,715,470 | 8/1955 | Marcus et al. | 214/77 P |
| 3,305,112 | 2/1967 | Brown | 214/77 P |
| 3,371,805 | 3/1968 | Himes | 214/75 T |
| 3,516,559 | 6/1970 | Walter | 214/730 |
| 3,637,097 | 1/1972 | Horowitz | 214/DIG. 10 |
| 3,651,965 | 3/1972 | Simonelli et al. | 214/75 T |
| 3,710,962 | 1/1973 | Fowler | 214/75 R |

Primary Examiner—Stanley H. Tollberg
Assistant Examiner—H. Grant Skaggs
Attorney, Agent, or Firm—Fulwider, Patton, Rieber, Lee & Utecht

[57] ABSTRACT

A vehicle-mounted device for use in moving a wheelchair and its occupant to and from the bed of a vehicle, comprising a platform for supporting the wheelchair, two parallelogram linkages having base links secured in place in the vehicle and end links carried by elongated arms swinging in space vertical planes, and means securing the platform to the end links for movement in a generally horizontal attitude along an arcuate path so that one edge of the platform passes close to the edge of the bed of the vehicle at the access opening, and engages a stop in the vehicle for folding the platform into a storage position as the linkages complete their arcs. A motorized chain-and-sprocket drive swings the linkages between lowered, outwardly extending positions and raised, upright storage positions in the vehicle, and controls are provided for operating the drive and stopping the platform in an intermediate, entry position level with the bed. A first embodiment has the base and end links horizontal, the platform carried on upright posts, and a second embodiment has the end and base links upright.

9 Claims, 14 Drawing Figures

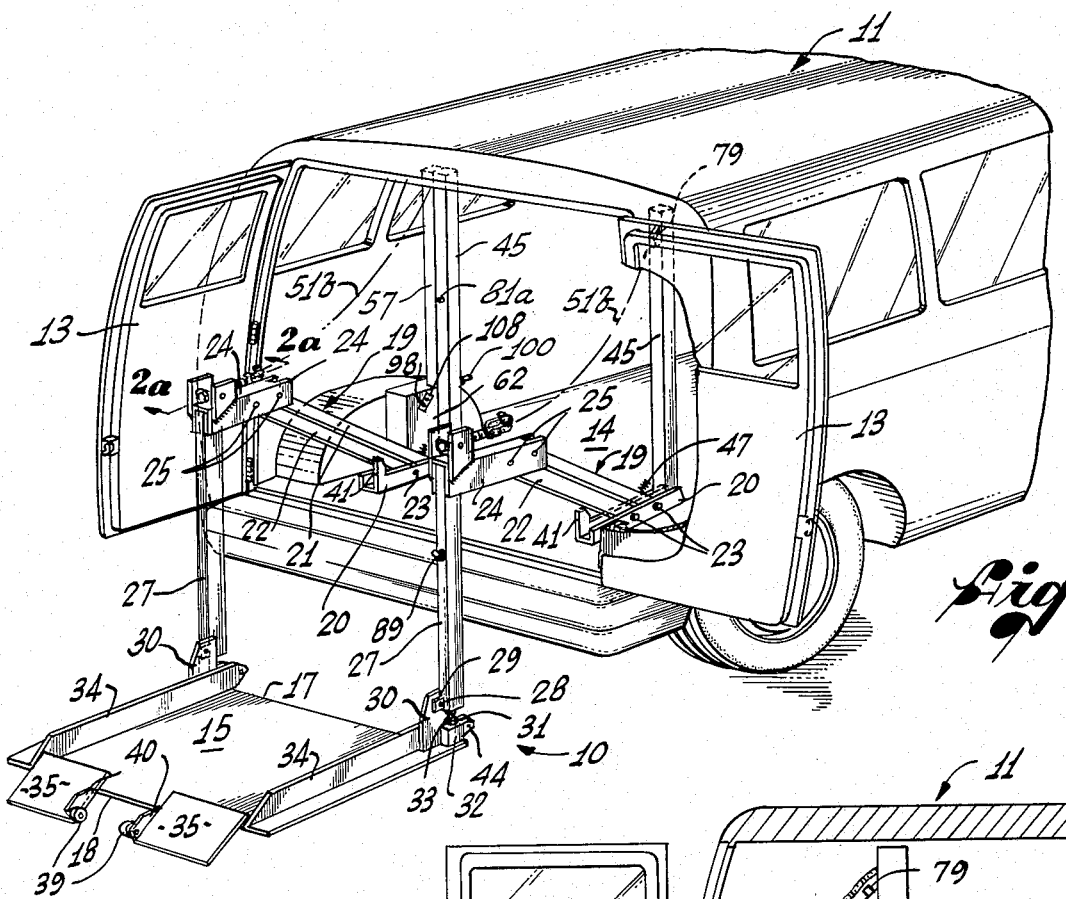
Fig.1
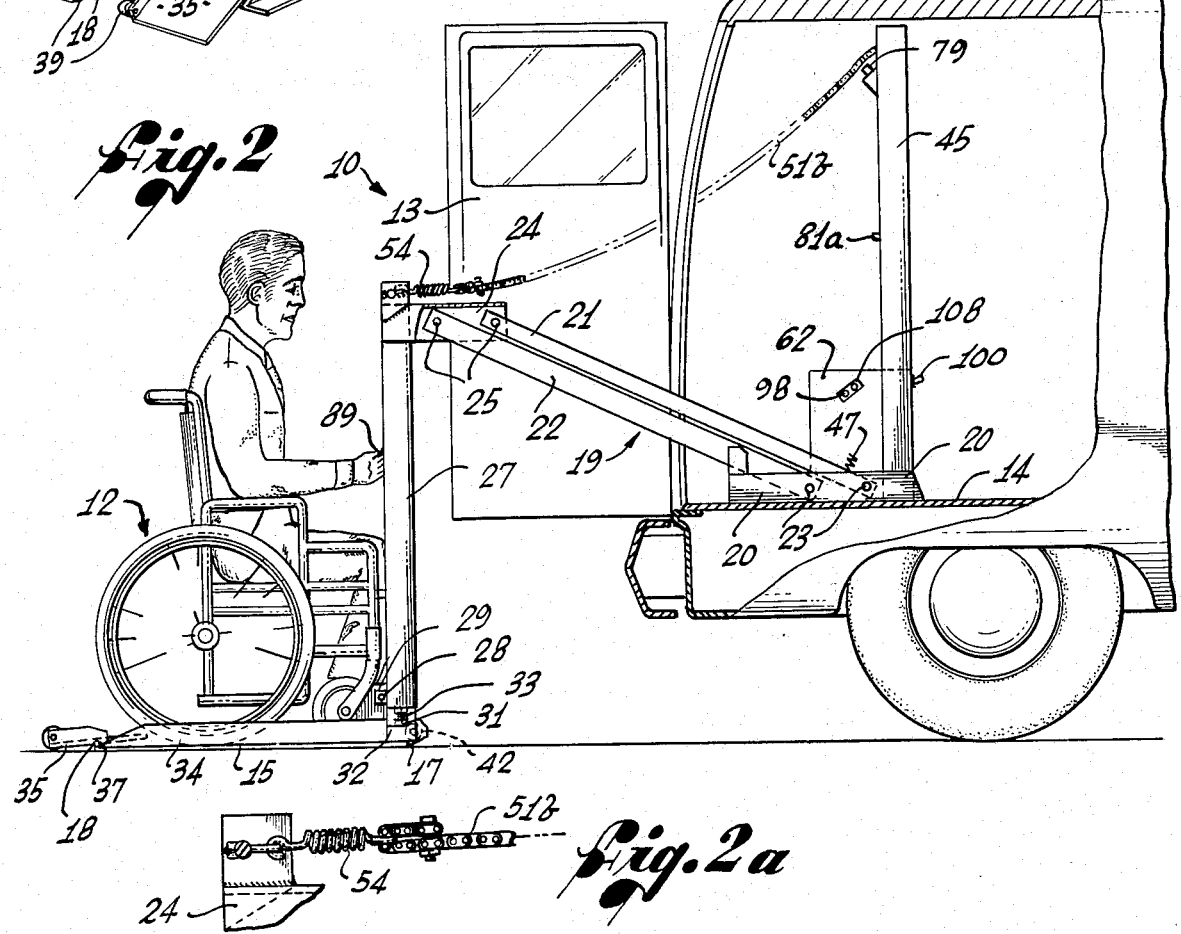
Fig.2
Fig.2a

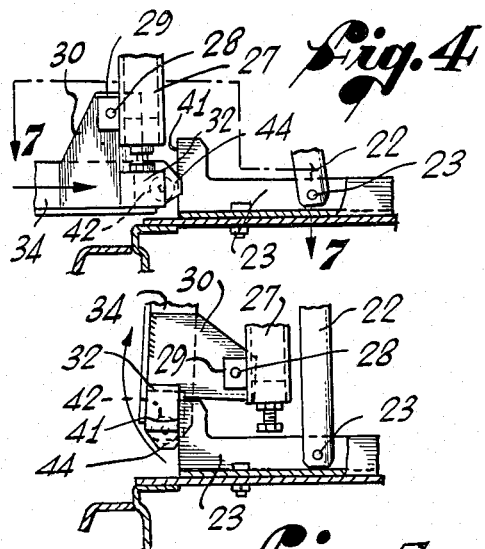
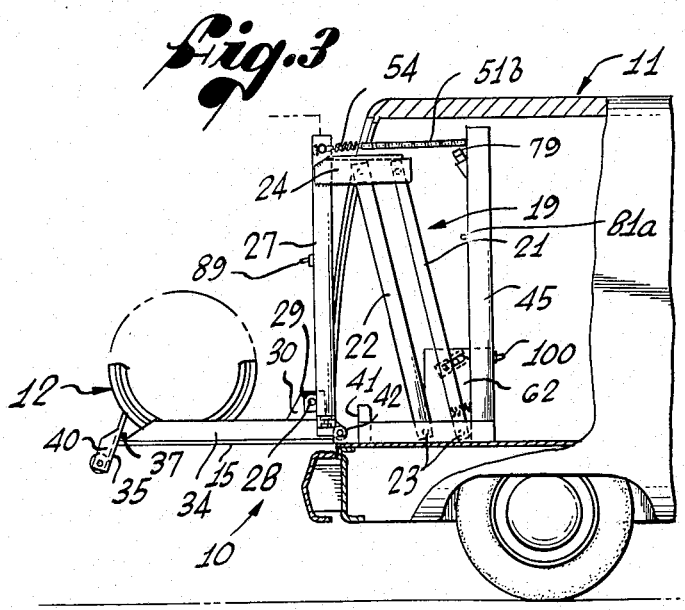
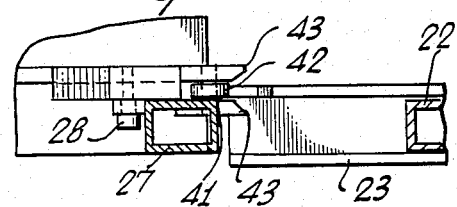
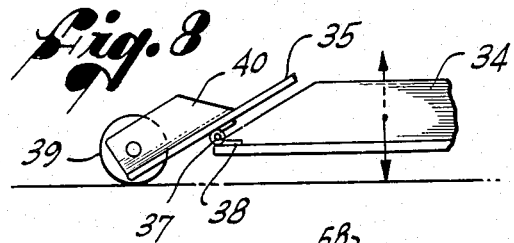
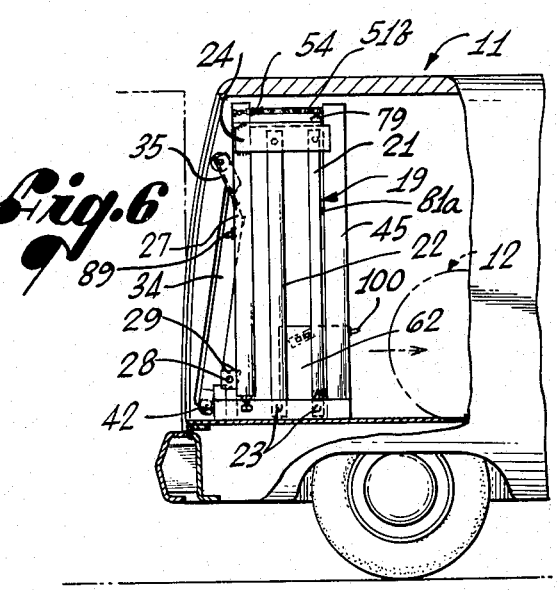
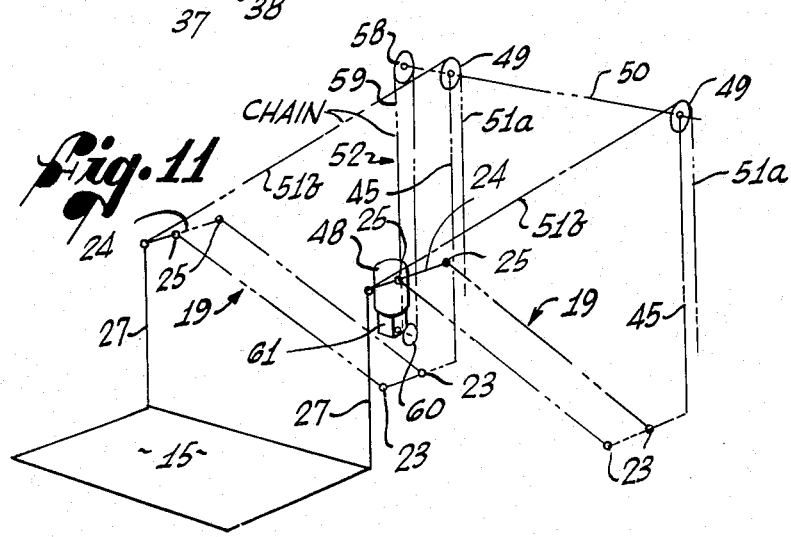
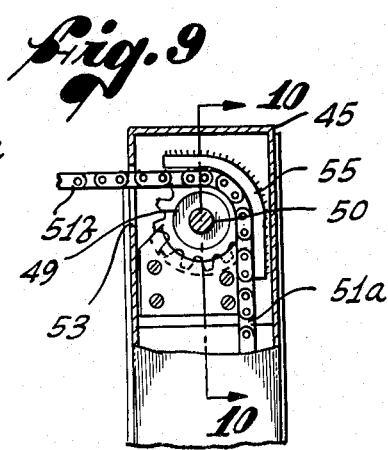

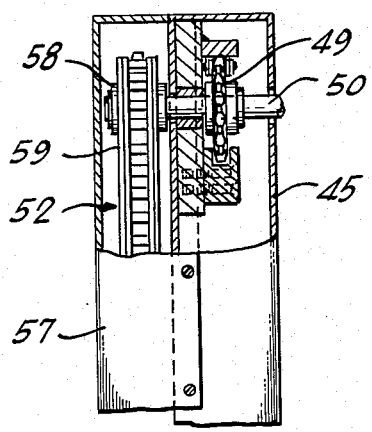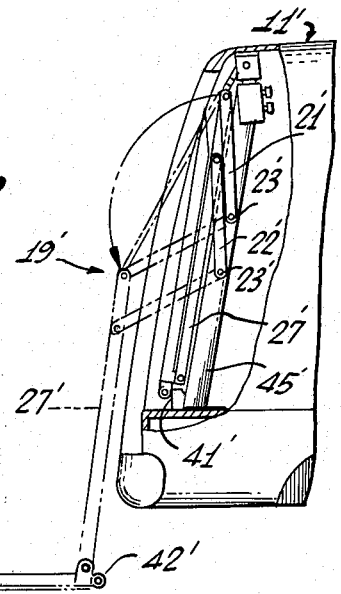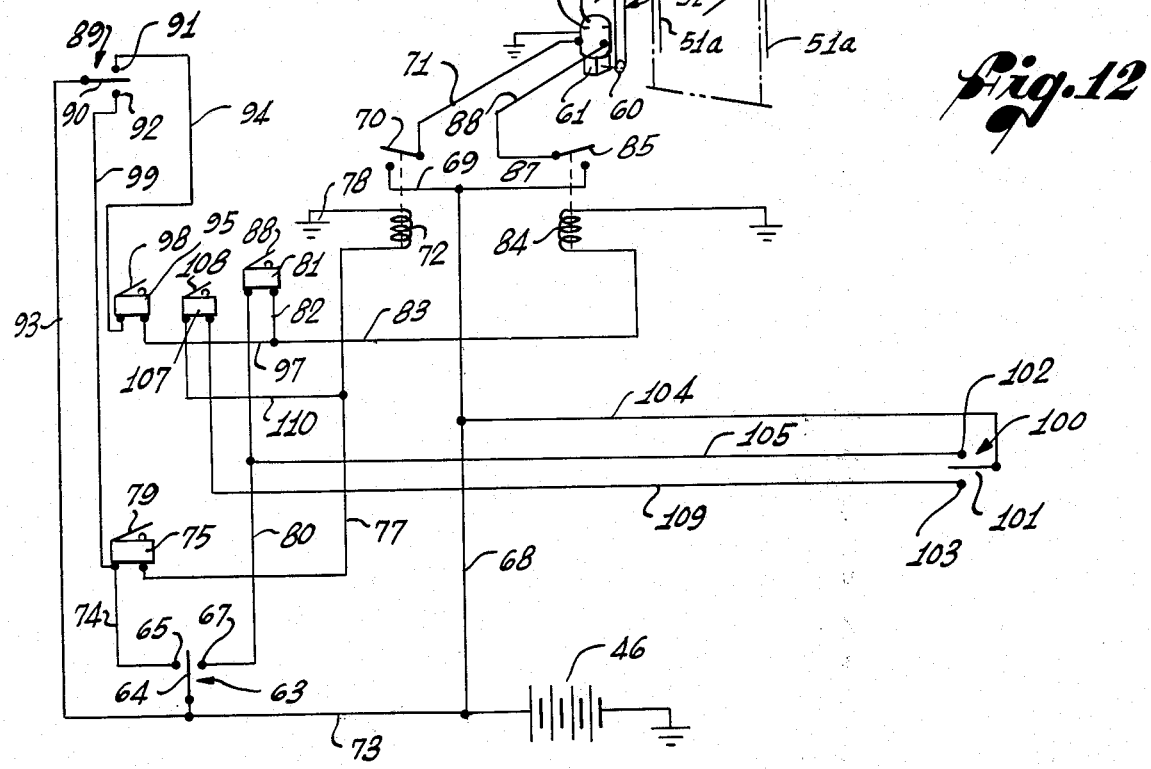

3,913,759

WHEELCHAIR LIFT

BACKGROUND OF THE INVENTION

This invention relates to lift devices and, more particularly, to a lift that is operable from a wheelchair to assist the occupant of the wheelchair in getting into and out of a vehicle.

Such devices are commercially available in various forms, one of which is simply a modified cargo lift of a type designed for trucks. This type of lift has been mounted on the rear of a van-type vehicle, and hinged to be folded into an upright position when not in use. Other lift devices that have been proposed are shown in U.S. Pat. Nos. 3,651,965; 3,613,917 and 3,516,559. These are specially designed elevator devices which are built into the vehicle so as to be stored inside when not in use.

With any such device, a primary consideration is ease of operation, because those confined to wheelchairs have limited manipulative ability and frequently do not have normal strength in their arms and hands. Moreover, because of the complete dependence of the wheelchair occupant upon the lift, stability and complete safety while on the lift are very important. Previous efforts to achieve these primary objectives have resulted in lift devices that are relatively complex in construction, relatively expensive to fabricate and install, sometimes bulky, and in the case of exterior lifts, unsightly and obstructive to rear vision, as well as subject to tampering and vandalism.

Accordingly, these prior devices have been only partially successful in providing a satisfactory lift device. The present invention provides an improved lift device which can be readily operated from a wheelchair, during both entering and leaving a vehicle, and at the same time is relatively simple in construction and installation so as to be capable of sale at a competitive price, and stores compactly in the vehicle when not in use.

SUMMARY OF THE INVENTION

The present invention resides in a wheelchair lift that is mountable in a vehicle beside an access opening therein, and is operable with easily accessible controls to move a wheelchair platform in a stable horizontal attitude back and forth along an arcuate path between a lowered, loading position and a raised, entry position, and also to move the platform automatically into and out of an upwardly folded, out-of-the-way storage position inside the vehicle. To these ends, the platform is carried by a pair of parallelogram linkages spaced apart to leave a passageway between them, and each having a base link secured in a preselected position within the vehicle adjacent the opening, two elongated arms pivotally mounted on the base link to swing about parallel axes into and out of the vehicle, and an end link pivoted on the arms to remain parallel to the base link in all positions of the arms. The linkages are mounted to swing in laterally spaced, parallel planes.

The platform is connected to the two linkages to be carried thereby in a generally horizontal position parallel to the floor of the vehicle. In a first embodiment, the base links are mounted on, and parallel to, the vehicle floor, and the platform is carried by two depending posts that are rigidly fastened at their upper ends to the two end links and are pivotally connected at their lower ends to the platform adjacent the front corners of the latter. These posts carry the front edge of the platform along an arc that passes very close to the lower edge of the vehicle opening during swinging of the linkages. In an alternative embodiment, the base links are upright posts mounted in the vehicle, and the end links are therefore disposed in upright positions, the platform being pivotally connected to the lower ends of downward extensions of the end links.

Downward pivoting of the platform from a generally horizontal position is positively blocked to maintain the platform parallel to the vehicle floor while a wheelchair and its occupant are on the platform, but the platform is free to pivot upward from the horizontal operating attitude. The platform is folded upwardly into the storage position as an incident to the terminal portion of the upward swinging of the linkages, by stop means which engage the leading edge of the platform and force it downwardly, thereby swinging the remainder of the platform upwardly.

More detailed features of the lift are found in the simplicity and sturdiness of the supporting structure within the vehicle, the manner in which the linkages are driven to raise and lower the platform, the control of the operation of the lift, and the specific structure for folding and unfolding the platform. Other aspects and advantages of the invention will become apparent from the following detailed description, taken in conjunction with the accompanying drawings.

BRIEF DESCRIPTION OF THE DRAWINGS

FIG. 1 is a perspective view showing a wheelchair lift embodying the present invention in a vehicle, the vehicle being partially broken away and the lift device being shown in the lowered position;

FIG. 2 is an enlarged side elevation of the lift in the lowered position, additional portions of the vehicle being broken away and shown in cross-section;

FIG. 2A is an enlarged fragmentary view of parts shown in FIG. 2;

FIG. 3 is a side elevation, similar to part of FIG. 2, showing the lift in an intermediate, entry position with the platform raised to the level of the bed of the vehicle;

FIG. 4 is an enlarged fragmentary view of parts shown in FIG. 3;

FIG. 5 is an enlarged fragmentary view similar to FIG. 4, with the platform shown in the tilted storage position;

FIG. 6 is a side elevation similar to FIG. 3 with the lift in the storage position;

FIG. 7 is a fragmentary cross-sectional view taken along line 7—7 of FIG. 4.

FIG. 8 is an enlarged side elevational view of part of the platform shown in FIG. 2, but shown with the platform raised slightly off the ground.

FIG. 9 is an enlarged fragmentary view, partially broken away and shown in cross-section, of a portion of the drive means of the lift;

FIG. 10 is a fragmentary cross-sectional view taken substantially along line 10—10 of FIG. 9;

FIG. 11 is a schematic diagram of the lift and the drive mechanism;

FIG. 12 is a schematic diagram of an electrical control system for the lift; and FIG. 13 is a fragmentary side elevation, partially broken away and shown in cross-section, illustrating an alternative form of the lift, the storage position being shown in full lines and the loading position in broken lines.

DETAILED DESCRIPTION OF THE FIRST EMBODIMENT

As shown in the drawings, the invention is embodied in a wheelchair lift, indicated generally by the reference number 10, that is mounted in a vehicle 11 to assist a person in a wheelchair 12 in getting into and out of the vehicle. The illustrative vehicle is a van that is equipped in a conventional way for operation by a person in a wheelchair, and having a rear access opening normally closed by two doors 13. The lift is mounted on the inside bed or floor 14 of the van, adjacent the access opening, and includes a platform 15, having a front edge 17 and a rear edge 18, and movable between a lowered, loading position (FIGS. 1 and 2) outside the van, a raised, entry position (FIG. 3) level with the floor of the van, and a storage position (FIG. 6) inside the van.

When the platform 15 is in the loading position, the wheelchair 12 can be rolled onto the platform. Then the lift 10 is actuated to raise the platform to the entry position, from which the wheelchair is rolled into the van 11. Finally, the lift is actuated to draw the platform into the van and into the storage position, permitting the doors 13 to be closed. Automatic door-operating equipment (not shown) may be provided to simplify the opening and closing of the doors.

When the wheelchair occupant wishes to get out of the van 11, the procedure is reversed. The doors 13 are opened, and the lift 10 is actuated to move the platform 15 to the entry position. The wheelchair 12 is rolled onto the platform, which then is lowered to the ground. After the wheelchair is off the platform, the entry procedure is repeated, returning the platform to the storage position.

In accordance with the primary aspect of the present invention, the platform 15 is supported for such movement by a pair of parallelogram linkages 19 which maintain the platform substantially parallel to the floor 14 of the van 11 while moving it along an arcuate path between the loading position and the entry position in which the front edge 17 of the platform is adjacent the rear end of the floor, and at substantially the same level. These linkages also cooperate with stationary stop means in the van to tilt the platform into an upright storage position inside the van, and with spring assistance, to tilt the platform out of the storage position preparatory to lowering of the platform to the entry position.

More specifically, as shown most clearly in FIGS. 1 and 2, each of the parallelogram linkages 19 comprises a relatively short base link 20 that is securely fastened to the floor 14 adjacent one side of the opening, two elongated arms 21 and 22 that are pivoted on the base link by means of two parallel pins 23 that are spaced apart longitudinally of the base link, and an end link 24 that extends between the free ends of the arms 21 and 22, parallel to the base link, and is pivotally connected to the arms by two parallel pins 25. The two arms 21 and 22 are relatively heavy bars, preferably composed of metal, and the two links 20 and 24 preferably are channel-shaped in cross-section, with the ends of the arms fitted into the channels with the pivot pins extending through the arms and into aligned holes in the opposite sides of the links.

To mount the platform 15 on the linkages 19, two elongated posts 27 are fastened to the rear end portions of the end links 24, which project rearwardly beyond the arms 21 and 22. These posts preferably are perpendicular to the end links, and extend downwardly, parallel to each other. The platform 15 is mounted on the posts adjacent their lower ends, to project horizontally to the rear from the posts in the normal operating condition of the lift.

The connections between the posts 27 and the platform 15 are formed by two aligned pivot pins 28 that are carried in two lugs 29 projecting rearwardly from the posts, somewhat above their lower ends. The pins 28 project into aligned holes in two brackets 30 which project upwardly from the platform near the two front corners thereof, thus mounting the platform on the posts for rocking movement about a horizontal axis defined by the pins 28.

Downward rocking from the horizontal position shown in FIGS. 1 and 2 is positively blocked by stops 31 on the lower ends of the posts, which abut against the tops of blocks 32 on the platform as shown in FIGS. 1 and 2. For adjustment of the normal operating position of the platform, the stops 31 are carried by screw adjustment mechanisms 33.

It will be seen that this mounting arrangement positively prevents downwardly, or counterclockwise movement of the platform 15 from the normal operating position, and thus maintains the platform parallel to the end links 24 at all times. Since the end links always are parallel to the base links 20 and the floor 14, the platform also remains parallel to the floor, which is substantially horizontal. Accordingly, as the arms swing upwardly in spaced vertical planes from the loading position to the entry position, the platform is positioned to raise the wheelchair and its occupant comfortably to the entry position.

Of course, the additional weight applied to the rear portion of the van 11 can result in a minor drop of the van, and the surface on which the van is parked can be other than perfectly horizontal. These factors, coupled with the fact that the platform 15 is in motion, make it highly desirable to provide safety features preventing the wheelchair from rolling off the platform.

For lateral protection, two elongated guide rails 34 are mounted on top of the platform, and spaced apart to lie on opposite sides of the wheels of the wheelchair 12. The brackets 30 are secured to the platform alongside the forward ends of these rails. For protection against rolling off to the rear, two ramp plates 35 are hingedly connected by pins 37 (FIGS. 2 and 8), approximately midway between their front and rear edges, to the rear edge 18 of the platform, and are positioned in the paths of the wheels of the wheelchair. These plates are free to rock between the position shown in FIG. 1, in which they are inclined slightly upward from their rear ends to facilitate movement of the wheelchair onto the platform, and the position shown in FIG. 3, in which they are nearly vertical, to serve as blocks for the wheels.

Each of the plates 35 is urged yieldably to the blocking position, either by gravity as a result of positioning the pivot far enough forward to unbalance the plate, or by a torsion spring 38 coiled around the pivot pin and stressed between the platform and the plate. To insure smooth movement from the blocking position to the ramp position as the platform is lowered to the ground, small ground-engaging wheels 39 are mounted on the plates near their rear edges, herein on axles projecting laterally from upstanding flanges 40 along the adjacent edges of the plates. Because the natural result of the weight on the platform is to tilt the platform 15 down, to the rear, to some extent, no detents should be needed along the front edge 17.

The stationary stop means for tilting the platform 15 to the storage position herein comprise rearwardly facing edges 41 on the rear ends of the base links 20, these edges being positioned for blocking engagement with two rollers 42 (see FIGS. 4, 5 and 7) that are journaled on the front of the platform. As shown in FIG. 3, when the platform 15 is in the entry position, each roller 42 is adjacent one of the edges 41, but spaced a short distance therefrom. Then, as the linkages 19 are raised farther into the van, the rollers are brought into engagement with the edges 41, as shown in FIGS. 4, 5 and 7. Beveled leading edges 43 (FIG. 7) on the rails 34 and on lugs 44 on the blocks 32 straddle the edges 41 to guide the rollers positively into engagement therewith.

Continued upward and inward swinging of the linkages 19 after such engagement causes each roller to move downwardly along the edge 41, which acts as a camming surface to impart a downward motion to the leading edge 17 of the platform 15, with accompanying upward motion to the remainder of the platform, around the pivot pins 29. The corner blocks 32 swing away from the stops 31, and the platform is pivoted upwardly and folded into the van. In the storage position, shown in FIG. 6, the elongated arms 21 and 22 are substantially perpendicular to the floor 14 of the van and the platform 15 preferably is tilted forward to allow clearance for the closing of the doors 13.

An upstanding hollow support post 45 is mounted on the floor 13 on the base link 20 of each of the linkages 19, to serve as a brace for the linkage and to support a portion of the drive mechanism of the lift. The upper ends of these posts may be connected to the ceiling of the van. In the folded condition of the lift, the forward arm 21 of the linkage 19 is substantially contiguous to the support post 45. A spring 47 on the front side of each arm 21 is compressed between the arm and the support post in the fully folded condition, and subsequently assists in initiating unfolding of the lift 10 as the linkages 19 swing away from the support posts.

The lift 10 is operated by a drive mechanism including a motor 48, preferably electric and reversible, which is powered by a battery 46 (FIG. 12) and controls the swinging of the linkages 19 between the storage, entry and loading positions shown in FIGS. 6, 3 and 2, respectively. The battery may be the vehicle battery or a separate battery for the lift alone. While various drive connections may be used, the preferred connection shown herein is of the chain-and-sprocket type including two sprockets 49 mounted on a shaft 50 extending between the upper ends of the support posts 45, and two chains 51 trained around these sprockets and each connected at one end to the free end portion of one of the linkages 19, the shaft 50 being driven by the motor 48 through another chain-and-sprocket drive 52 shown in part in FIG. 9 and schematically in full in FIG. 11.

As best seen in FIGS. 9, 10 and 11, the shaft 50 extends into the hollow interior of each post 45, and the sprockets 49 are mounted on the shaft inside the posts. The chains 51 make a substantially 90° turn around the sprockets, each having an inner end portion $51^a$ which hangs down from the sprocket within the post, and an outer end portion $51^b$ which extends rearwardly out of the post through an opening 53 (FIG. 9) therein. The outer end portions are connected to free ends of the linkages 19 through coiled compression springs 54, which herein are fastened to the upper ends of the posts 27 and serve to smooth out the operation of the lift. An arcuate chain guide 55 is mounted inside each post to hold the chain in proper meshing engagement with the sprocket 49.

Mounted on the outer side of the left-hand support post 45 is a shroud 57 which covers the drive 52 for the sprocket shaft 50, as shown in FIG. 10. This drive comprises an upper sprocket 58 on the end of the shaft 50 within the cover, an endless chain 59, and a lower sprocket 60 (FIGS. 11 and 12) mounted below the lower end of the shroud on the output shaft of a gear box 61. The motor 48 is mounted on this gear box to drive the lower sprocket through appropriate reduction gearing (not shown), thereby to turn the sprocket shaft 50 and drive the chains 51 back and forth to swing the linkages 19 between their various positions. As shown in FIGS. 1 and 2, the motor 48 and the gear box 61 are enclosed in a protective cover 62, and are located out of the wheelchair passageway between the posts 45.

Operation of the drive motor 48 is controlled by suitable electric circuitry, shown in FIG. 12, and two sets of electrical switches, one set being manually operable from the wheechair 12 in different conveniently accessible locations, and the other set being automatically operable in response to movement of the platform 15 into various positions. Using the manual switches, the occupant of the wheelchair can lower the platform 15 to the ground from the van 11, initiate movement of the entry position after boarding the platform, fold the platform into the storage position after entering the van, return the platform to the entry position from inside the van preparatory to exiting, and lower the occupied platform to the ground from the entry position. The automatic switches override the manual switches and stop the lift as the platform arrives at each of the three stationary positions shown in FIGS. 1, 3 and 6, except when the unoccupied lift is being raised and lowered from outside the vehicle, the entry position being by-passed in this situation.

Specifically, the manual switches include an exterior switch 63 that is accessible from the ground and preferably is key operated for lowering the platform prior to entry and raising it after exiting. This switch may be fitted on the rear portion of a rear fender of the van. As shown schematically in FIG. 12, it has a key-controlled switch arm 64 normally disposed in a neutral position and movable selectively into engagement with either of two contacts 65 and 67.

When the platform 15 is to be lowered from the storage position, the arm 64 is moved to the left to the contact 65, thereby completing a "down" circuit for the motor 48, from the battery 46, through a line 68 to a line 69, a switch 70 which is closed by the key switch 63, and a line 71 leading to the motor 48, to run it in the down direction. The switch 70 is closed by a solenoid coil 72 which is energized by a circuit from the battery including a line 73, the switch 63, a line 74 to a normally closed switch 75, and a line 77 to the coil 72, which is grounded at 78. When this coil is energized, it closes the switch 70 in the motor circuit to operate the motor in a direction to pay out the chains 51 and lower the linkages 19 and the platform 15. As long as the switch arm 64 is held against the left contact 65, and the switch 75 remains closed, the motor continues to run and to lower the platform.

To terminate motor operation when the platform 15 reaches the ground, an actuator 79 for the switch 75 is mounted under one of the chains 51, to be engaged by the chain when it begins to sag after the platform engages the ground. This breaks the energizing circuit to the coil 72 and opens the motor switch 70 with the platform in position to be boarded.

Similarly, when the platform 15 is to be raised to the storage position after the lift 10 has been used to get out of the van 11, the key-switch arm 64 is moved to the right contact 67. This completes a circuit from the battery 46 through the line 73, the switch 63, another line 80, a normally closed switch 81, and lines 82 and 83 to the coil 84 of a second grounded solenoid, which closes a switch 85 in the "up" circuit of the motor 48. This up circuit is formed by the line 68, as before, a line 87 to the switch 85, and a line 88 to the motor.

The actuator 81$^a$ of the switch 81 is positioned on one of the support posts 45 (see FIGS. 1, 2 and 3) to be engaged by the associated arm 21, thereby breaking the up circuit and stopping the motor when the platform has been folded into the storage position.

Another manual switch 89 is provided on the platform 15, herein on one of the posts 27 so as to be easily reached from a wheelchair 12 on the platform, as illustrated in FIG. 2. The arm 90 of switch also has a central neutral position, shown in FIG. 12, between two contacts 91 and 92, and can be moved up to the contact 91 to complete an up circuit for the motor 48. The coil 84 is energized by the battery 46 through the line 73 and a line 93 to the switch 89, a line 94 leading to a normally closed switch 95, and from this switch through a line 97 to the line 83 and the coil 84. Again, energization of this coil closes the motor switch 85 to initiate raising of the platform.

When the platform 15 is raised with this switch 89, it is stopped automatically in the entry position by opening of the switch 95, which has an operator 98 (see FIG. 2) positioned alongside the path of the arm 21 to be engaged by the arm as the platform approaches the entry position. A slight and predictable overrun after the switch operator 98 is engages brings the platform to the entry position as movement stops.

Similarly, when the platform 15 has been boarded from the van 11 in the entry position, the switch 89 is used to lower the platform to the ground. For this purpose, the switch arm 90 is moved down to the contact 92 to complete a down circuit from the battery 46 to the down coil 72, through the lines 73 and 93, the switch 89, a line 99 leading to the normally closed "ground" switch 75, and the line 77 to the coil. Thus, the down motor switch 70 is closed to lower the platform until the ground switch is opened, by sagging of the chain 51 onto the switch operator 79.

Movement of the platform 15 to and from the storage position by a person inside the van 11, after entering the van or preparatory to existing, is controlled by a third manual switch 100, preferably mounted on the front of the motor cover 62 inside the van. This switch also has an arm 101 with a neutral position between two contacts 102 and 103. When the switch is moved up to the contact 102, an up circuit is completed to the motor 48 through the line 68 and the motor switch 85, which is closed upon energization of the coil 84 through a circuit including the line 68, a line 104 leading to the switch 100, a line 105 leading to the line 80 that is connected to the normally closed upper limit switch 81, and the line 83 to the coil 84. When the platform reaches the storage position, the arm 21 opens the switch 81 to stop the motor 48.

When the platform 15 is to be lowered from the storage position, the inside switch 100 is moved down to the contact 103, which completes a circuit from the battery 46 to the down coil 72 through a normally closed switch 107 having an operator 108 along the path of the upper arm 21 of the linkage 19, this circuit including the lines 68 and 104, a line 109 from the contact 103 to the switch 107, and a line 110 leading to the line 77 connected to the down coil, which closes the down motor switch 70.

This switch 70 remains closed as the platform 15 is lowered, until the arm 21 engages the switch operator 108 and opens the switch 107 to break the circuit, just before the platform reaches the entry position, so that the predictable overrun positions the platform for entry from the van.

The two switch operators 98 and 108 for terminating raising and lowering as the platform 15 approches the entry position are mounted on the side of the motor cover 62, as shown in FIGS. 1 and 2, and preferably are adjustable for selection of the proper position for engagement with the linkage arm 21. The operators project through an inclined elongated slot 111, which accommodates such adjustment.

It should be understood that this circuitry is merely one possible arrangement for controlling the lift 10 of the present invention, and that other circuits could be devised to accomplish the necessary control. The important functions are to provide for manual actuation through the various motions, and preferably automatic stopping in the entry position for movement of the wheelchair into and out of the van. The illustrative controls have been found to be satisfactory for these purposes.

DESCRIPTION OF THE ALTERNATIVE EMBODIMENT

Shown in FIG. 13 is an alternative embodiment of the invention, which is of somewhat simplified and more compact construction. For ease of description, parts of this embodiment which correspond to parts of the first embodiment are identified by corresponding primed reference numbers, and only the significant differences are described in detail.

In this instances, the lift 10' comprises a pair of parallelogram linkages 19' (one being shown) that are mounted in the van 11' on two upright support posts 45' which serve as the base links of the linkages, eliminating the links 20. These posts preferably have a slight forward incline.

Two parallel arms 21' and 22' are pivoted on each support post 45', on vertically spaced pins 23' a substantial distance below the upper ends of the posts. The end links of the linkages are formed by upright posts 27', pivotally connected to the free ends of the arms 21', 22' by spaced pins 25'. The posts 27' have downward extensions, which are pivotally connected to the platform, as before. The posts 27', being parallel to the posts 45', also have a slight forward incline.

The platform 15' has rollers 42' at its leading corners for engagement with stationary camming surfaces 41' in the van, and thus is folded upwardly into a storage position, as before. The other operating and control elements are provided in the same general manner as in the first embodiment, with such minor modifications as are necessary to adapt them to the modified linkage arrangement.

It will be seen that this embodiment utilizes the inside posts 45' and the outside posts 27' as the base and end links of the parallelogram linkages 19', and uses shorter arms 21' and 22' than those in the first embodiment. The arc of movement is shorter, as indicated by the dotted lines in FIG. 13, but the second embodiment performs the same functions as the first embodiment, and has the same basic advantages. The downward extensions of the end links serve the same purpose as the posts 27, and the upward extensions of the base links serve the functions of the support posts 45.

From the foregoing, it should be evident that the present invention provides a practical, sturdy and coveniently operated wheelchair lift which makes it possible even for a severely handicapped person of reduced strength and manipulative ability to enter and exit from a vehicle. At the same time, the lift is relatively simple in construction, and folds compactly into the vehicle when not in use.

It also will be evident that, while two specific embodiments of the invention have been illustrated and described, various modifications and changes may be made without departing from the spirit and scope of the invention.

I claim:

1. A wheelchair lift mountable in a vehicle adjacent an access opening thereof, for use in moving a wheelchair and its occupant to and from a generally horizontal bed of the vehicle, comprising:

a pair of spaced parallelogram linkages each having a base link mountable in said vehicle adjacent the access opening, two side-by-side elongated arms pivotally mounted on said base link for swinging about spaced, parallel axes between upright positions in the vehicle, in which the arms extend upwardly from said base links, and lowered positions in which said arms project out of the vehicle through the access opening, and an end link parallel to said base link and pivotally mounted on the ends of said arms opposite the base link;

said linkages being spaced apart for mounting in the vehicle adjacent opposite sides of the access opening for swinging in substantially parallel planes, and to leave a passageway for a wheelchair between the linkages;

a flat and generally rectangular platform sized to support a wheelchair, said platform having one edge disposed beneath the said end links when said arms are in said lowered positions;

posts extending from said end links down to said platform;

a pivot connecting each of said posts to said platform for tilting of the platform about an axis above, and extending along, said one edge;

first stop means carried by said posts and acting against said platform to hold the platform against downward tilting from a generally horizontal operating position, but permitting upward tilting of the platform;

said posts being of a preselected length for supporting said platform at ground level when said arms are in the extended position, and for moving said one edge along an arc passing closely adjacent the edge of the bed at the access opening, and past the edge through the opening;

drive means for selectively swinging the arms of said linkages from said lowered positions to said upright positions and back;

control means for actuating said drive means and for stopping said linkages in each direction of movement with said platform in an intermediate position level with the bed, for movement of a wheelchair into and out of the vehicle;

and cam means positioned along said arc adjacent said base links for engagement with said one edge after the latter passes through the access opening and as the arms of said linkages swing into said upright positions, and operable to force said one edge downward to tilt said platform upward into a storage position.

2. A wheelchair lift as defined in claim 1 in which said drive means includes a reversible motor, and a chain-and-sprocket drive including at least one length of chain having one end connected to one of said linkages adjacent the end link thereof, and a sprocket for said chain supported inside the vehicle and driven by said motor, said chain extending from said end link to said sprocket and being engaged with the latter to be fed longitudinally in opposite directions by said sprocket, thereby to swing said linkages between said positions.

3. A wheelchair lift as defined in claim 2 further including a resiliently extendable spring connecting said chain to said linkage.

4. A wheelchair lift as defined in claim 2 further including two support posts extending upwardly from said base links, said drive means including sprockets rotatably mounted on the upper end portions of said posts, a chain on each of said sprockets having a first end portion hanging downward and a second end portion extending from the sprocket to the associated end link, and connected to the latter, and a motor for driving said sprockets to feed said chains longitudinally in unison, thereby to swing said linkages.

5. A wheelchair lift as defined in claim 1 in which said arms are straight bars, and are disposed in vertically spaced relation in a common plane.

6. A lift mountable in a vehicle adjacent an access opening thereof, for use in moving an object such as a wheelchair to and from a generally horizontal bed of the vehicle, comprising:

a pair of parallelogram linkages each having a base link mountable in the vehicle adjacent the access opening, two side-by-side elongated arms pivotally mounted on said base link for swinging about spaced, parallel axes between upright positions in the vehicle and outwardly extending, lowered positions, and an end link pivotally mounted on the ends of said arms opposite said base link;

said linkages being spaced apart for mounting in the vehicle for swinging in substantially parallel planes;

a platform for holding the object;

means connecting one edge portion of said platform to both of said end links and holding the platform in a preselected angular position on said end links to maintain the platform generally parallel to said bed during swinging of said linkages and to move said one edge along an arc passing close to the end of the bed at the access opening;

and drive means for selectively swinging said linkages to said upright position, said lowered position, and an intermediate position in which said platform is level with the bed with said one edge adjacent the end thereof, including a reversible electric motor and operating circuitry therefor, first and second manual actuating switches for operating said motor from outside the vehicle and from inside the vehicle, a third manual switch mounted adjacent said platform for movement therewith and for operation by a person on the platform, and switch means responsive to movement of said platform to said intermediate position from either direction for overriding said third switch and stopping the platform in said intermediate position.

7. A lift as defined in claim 6 in which said connecting means connect said platform to said end links for upward pivotal movement from said preselected angular position about an axis extending along, and spaced above, said one edge, for folding of said platform upwardly into a storage position when said arms are in the upright positions, while preventing downward pivoting of the platform from said preselected angular position, and further including cam means in said vehicle and follower means adjacent said one edge, for forcing said one edge downwardly as said arms approach said upright position, thereby to fold the platform automatically to said storage position.

8. A lift mountable in a vehicle adjacent an access opening thereof, for use in moving an object such as a wheelchair to and from a generally horizontal bed of the vehicle, comprising:

a pair of parallelogram linkages each having a base link mountable in the vehicle adjacent the access opening, two side-by-side elongated arms pivotally mounted on said base link for swinging about spaced, parallel axes between upright positions in the vehicle and outwardly extending, lowered positions, and an end link pivotally mounted on the ends of said arms opposite said base link;

said linkages being spaced apart for mounting in the vehicle for swinging in substantially parallel planes;

a platform for holding the object;

two posts extending from said end links down to said platform;

a pivot connecting the lower end portion of each post to said platform adjacent a front corner thereof, for tilting of the platform about an axis disposed above, and extending along, a front edge of the platform, and holding said platform for movement of said front edge along an arc passing close to the end of the bed at the access opening, and beyond the end of the bed, into the vehicle;

means for preventing downward tilting of said platform from a generally horizontal position, but permitting upward tilting into a storage position in which the rear edge of the platform is adjacent said posts;

drive means for selectively swinging the linkages, in unison, to said upright position, said lowered position, and an intermediate position in which said platform is level with the bed with said front edge adjacent, but spaced from, the end thereof;

means on said platform and said linkages for tilting said platform to said storage position automatically as an incident to movement of said linkages to said upright positions, comprising at least one set of cam and follower elements including a follower on said platform adjacent said front edge, and a cam on one of said base links inside the vehicle positioned to engage said follower and cam the latter downwardly as said linkages move into said upright positions.

9. A lift mountable in a vehicle adjacent an access opening thereof, for use in moving an object such as a wheelchair to and from a generally horizontal bed of the vehicle, comprising:

a pair of parallelogram linkages each having a base link mountable in the vehicle adjacent the access opening, two side-by-side elongated arms pivotally mounted on said base link for swinging about spaced, parallel axes between upright positions in the vehicle and outwardly extending, lowered positions, and an end link pivotally mounted on the ends of said arms opposite said base link;

said linkages being spaced apart for mounting in the vehicle for swinging in substantially parallel planes;

a platform for holding the object;

two posts extending from said end links down to said platform;

a pivot connecting the lower end portion of each post to said platform adjacent a front corner thereof, for tilting of the platform about an axis disposed above, and extending along, a front edge of the platform, and holding said platform for movement of said front edge along an arc passing close to the end of the bed at the access opening, and beyond the end of the bed, into the vehicle;

means for preventing downward tilting of said platform from a generally horizontal position, but permitting upward tilting into a storage position in which the rear edge of the platform is adjacent said posts;

drive means for selectively swinging the linkages, in unison, to said upright position, said lowered positions; and an intermediate position in which said platform is level with the bed with said front edge adjacent, but spaced from, the end thereof, said drive means including two sprockets rotatably supported in the vehicle adjacent said access opening above the bed thereof, a chain for each of said sprockets having one end portion extending from the sprocket outwardly over one of the linkages, means connecting said chains to said linkages, means for driving said sprockets to feed said chains back and forth and swing said linkages between said positions;

means for tilting said platform to said storage position automatically as said linkages move to said upright positions and including means stopping inward movement of said platform as said linkages move to said upright positions, and means, including said chains, operating to tilt the platform to said storage position after inward movement of said platform is stopped.

* * * * *